US012519214B2

(12) United States Patent
Ai et al.

(10) Patent No.: US 12,519,214 B2
(45) Date of Patent: Jan. 6, 2026

(54) CONNECTOR ASSEMBLY AND BASE STATION ANTENNA

(71) Applicant: Outdoor Wireless Networks LLC, Claremont, NC (US)

(72) Inventors: Bin Ai, Jiangsu (CN); Qiang Wang, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 340 days.

(21) Appl. No.: 18/252,640

(22) PCT Filed: Oct. 4, 2021

(86) PCT No.: PCT/US2021/053310
§ 371 (c)(1),
(2) Date: May 11, 2023

(87) PCT Pub. No.: WO2022/103516
PCT Pub. Date: May 19, 2022

(65) Prior Publication Data

US 2024/0006745 A1 Jan. 4, 2024

(30) Foreign Application Priority Data

Nov. 16, 2020 (CN) ........................ 202011275627.X

(51) Int. Cl.
*H01R 13/506* (2006.01)
*H01Q 1/24* (2006.01)
(Continued)

(52) U.S. Cl.
CPC ......... *H01Q 1/246* (2013.01); *H01R 13/5025* (2013.01); *H01R 13/506* (2013.01);
(Continued)

(58) Field of Classification Search
CPC .. H01R 13/506; H01R 13/631; H01R 13/646; H01R 13/5025; H01R 13/6315;
(Continued)

(56) References Cited

U.S. PATENT DOCUMENTS 3,094,364 A 6/1963 Liagg
4,697,859 A 10/1987 Fisher
(Continued)

FOREIGN PATENT DOCUMENTS

EP 1207592 A2 5/2002

OTHER PUBLICATIONS

"International Preliminary Report on Patentability corresponding to International Application No. PCT/US2021/053310 mailed May 25, 2023".
(Continued)

*Primary Examiner* — Tung X Le
(74) *Attorney, Agent, or Firm* — Myers Bigel, P.A.

(57) ABSTRACT

The present disclosure relates to a connector assembly and a base station antenna comprising such connector assembly. The connector assembly comprises a connector (1), where the connector has a port (11). The connector assembly further comprises a guide ring (2), where the guide ring is installed in front of the port of the connector and is radially and elastically supported. The guide ring has an inner surface (21) that tapers towards the port of the connector on part of the axial length, and is used to guide the port of the matching connector in the port of the connector. The connector assembly allows increased deviation when matching connectors are mated.

20 Claims, 4 Drawing Sheets

(51) Int. Cl.
*H01R 13/502* (2006.01)
*H01R 13/631* (2006.01)
*H01R 24/60* (2011.01)

(52) U.S. Cl.
CPC ......... *H01R 13/6315* (2013.01); *H01R 24/60* (2013.01); *H01R 2201/02* (2013.01)

(58) Field of Classification Search
CPC ........ H01R 24/40; H01R 24/52; H01R 24/60; H01R 24/542; H01Q 1/246
See application file for complete search history.

(56) References Cited

U.S. PATENT DOCUMENTS

| | | | | |
|---|---|---|---|---|
| 7,753,705 | B2 | 7/2010 | Montena | |
| 7,758,370 | B1 * | 7/2010 | Flaherty | H01R 13/6275 439/352 |
| 10,211,568 | B2 * | 2/2019 | Blakborn | H01R 13/508 |
| 10,739,833 | B2 * | 8/2020 | Chai | G06F 1/203 |
| 11,121,503 | B1 * | 9/2021 | Kan | H01R 13/639 |
| 2010/0210129 | A1 | 8/2010 | Arts et al. | |
| 2013/0137299 | A1 | 5/2013 | Chastain et al. | |
| 2014/0209636 | A1 * | 7/2014 | Wang | B05B 11/1002 222/384 |
| 2019/0221969 | A1 * | 7/2019 | Ruffini | H01R 13/6315 |
| 2021/0313742 | A1 * | 10/2021 | Zhang | H01R 13/11 |
| 2021/0351550 | A1 * | 11/2021 | Urtz | H01R 13/625 |

OTHER PUBLICATIONS

"International Search Report and Written Opinion corresponding to International Application No. PCT/US2021/053310 mailed Jan. 14, 2022".

* cited by examiner

CONNECTOR ASSEMBLY AND BASE STATION ANTENNA

RELATED APPLICATION

The present application is a 35 U.S.C. § 371 national phase application of PCT Application PCT/US2021/053310, filed Oct. 4, 2021, which claims priority from and the benefit of Chinese Patent Application No. 202011275627.X, filed Nov. 16, 2020, the disclosure of each of which is hereby incorporated herein in its entirety.

TECHNICAL FIELD

The present disclosure relates to a connector assembly and a base station antenna comprising such connector assembly.

BACKGROUND ART

In radio communications systems, such as in base station antennas, electrical connectors can be used to connect electrical cables or optical connectors can be used to connect optical cables. An example of an electrical connector is a radio frequency connector. Coaxial cables can form a circuit used to transmit radio frequency signals with the help of radio frequency connectors for interconnection. In some cases, blind-mate matching connectors can be expected. Typically, blind-mating of matching connectors requires relatively accurate alignment. If there are deviations that are not allowed during blind-mating of matching connectors, it may cause blind-mating failure or connector damage. Typically, in base station antennas, blind-mating of matching radio frequency connectors requires minor axial deviation, minor radial deviation, such as a maximum radial deviation of 1 mm, and angular deviation, such as a maximum angular deviation of 2□. These minor deviations that need to be met may require relatively high manufacturing precision and mounting precision of base station antenna parts, resulting in high costs. This is especially true when many pairs of matching connectors need to be simultaneously blind-mated, and this is because a plurality of deviations may be accumulated.

SUMMARY

The purpose of the present disclosure is to provide a connector assembly and a base station antenna comprising such a connector assembly, wherein, as compared to prior art, the connector assembly can allow increased deviation when matching connectors are mated.

Based on the first aspect of the present disclosure, the purpose is achieved through a connector assembly, which comprises a connector, where the connector has a port. The connector assembly further comprises a guide ring, where the guide ring is installed in front of the port of the connector and is radially and elastically supported. The guide ring has an inner surface that tapers towards the port of the connector on part of the axial length, and is used to guide the port of the matching connector in the port of the connector.

In the connector assembly according to the present disclosure, the guide ring allows increased deviation, such as angular deviation and/or radial deviation and/or axial deviation during mating of matching connectors.

The tapering of the inner surface of the guide ring may allow increased deviation of the associated connectors during their mating, such as angular deviation and radial deviation. In addition, the radially elastic support for the guide ring may attribute to allowance of increased deviation, such as axial deviation, angular deviation and radial deviation. In the case where the connector assembly has a housing of plastic material, the allowance of increased deviation may also be further promoted.

The connector assembly according to the present disclosure may be particularly advantageous to the blind mating of matching connectors according to the design.

In some embodiments, the inner surface of the guide ring may be configured as an inner circular conical surface.

In some embodiments, the guide ring may have counterbores on the end side facing the connector and the guide ring is fit onto the port of the connector through the counterbores.

In some embodiments, the inner surface of the guide rings may be transitioned to the port of the connector.

In some embodiments, the connector assembly may comprise a flexible ring fit onto the guide ring.

As a potential replacement, the connector assembly may comprise a flexible element integrated on the guide ring. For example, the flexible element may be an elastomer material vulcanized on the guide ring.

In some embodiments, the guide ring and flexible ring may be integrated using different plastics through two-component injection molding.

In some embodiments, the guide ring may have grooves on its outer peripheral surface, and the flexible ring may have protrusions on its inner peripheral surface. The protrusions are embedded in the grooves, so that the guide ring and flexible ring form an axially locked connection.

In some embodiments, the grooves may be ring grooves, and the protrusions may be annular protrusions.

In some embodiments, the guide rings may be made of plastic, or made of metals or any other suitable materials.

In some embodiments, the flexible rings may be circumferentially distributed outer teeth. When matching connectors are mated and where there are deviations between the two, the flexible ring is extruded and deformed when supporting the guide ring, wherein, the concave part between adjacent outer teeth facilitates the extrusion and deformation of the flexible ring.

In some embodiments, the flexible ring may be made of soft elastic rubber material, elastomer and/or foam material.

In some embodiments, the connector assembly may comprise a housing, where the housing may have an receptacle. The receptacle is used to accommodate the connector, guide ring and component that radially and elastically supports the guide ring.

In some embodiments, the housing may comprise an annular axial stop extending inwards radially that is used for the guide ring.

In some embodiments, the inner surface of the guide ring may transition to the inner surface of the axial stop.

In some embodiments, the housing may be configured into two pieces. For example, the housing may comprise a housing base part and housing cover.

In some embodiments, the housing cover and housing base part may be connected through at least one screw connection and/or at least one snap-fit connection.

In some embodiments, the housing may be made of plastic.

In some embodiments, the connector assembly may comprise at least two connectors that are installed side by side or installed in parallel to each other.

In some embodiments, the connector may be an electrical connector or optical fiber connector. For example, the connector may be at least one in the following group: BMA connector, SMP connector, SMPM connector, SMPS connector, BNC connector and analogs.

In some embodiments, the connector may be a radio frequency connector.

Based on the second aspect of the present disclosure, the purpose is achieved through a base station antenna, which comprises the connector assembly based on the first aspect of the present disclosure.

In some embodiments, the base station antenna may comprise a functional module, where the functional module may have a matching connector and the functional module and connector assembly can move relative to each other, so that the functional module and matching connector are mated to the connector of the connector assembly.

In some embodiments, at least one of the functional module and connector assembly can be guided, so that the matching connector of the functional module and the connector of the connector assembly are mated via blind mating.

In some embodiments, the functional module may be configured as a linear movably-guided phase shifter drive module. The connector module is fixedly mounted on the base station antenna, and the matching connector can be mated to the connector of the connector assembly via blind mating.

In some embodiments, the functional module may comprise at least two matching connectors installed in parallel to each other, and the connector assembly may comprise two connectors, such as connectors configured as radio frequency connectors that are installed in parallel to each other.

The various technical features mentioned above, various technical features that will be mentioned below, and technical features obtained from the drawings may be combined arbitrarily as long as the combined individual technical features do not conflict with each other.

BRIEF DESCRIPTION OF THE DRAWINGS

The present disclosure will be explained in more detail by means of embodiments with reference to the attached drawings.

SPECIFIC EMBODIMENTS

Figure 1:
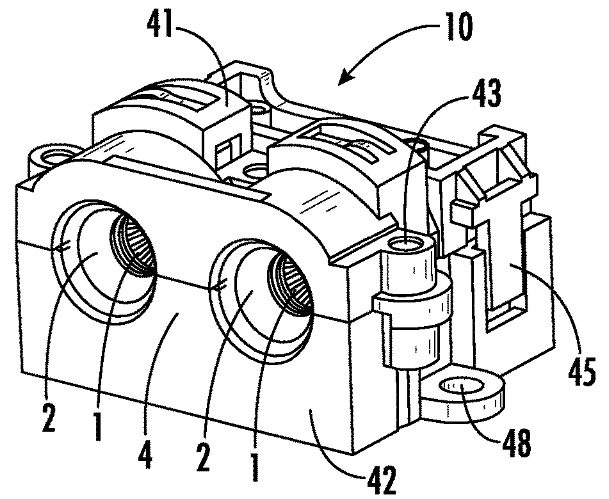
FIGS. 1 and 2 are front and rear perspective views of a connector assembly according to an embodiment of the present disclosure.
Figure 2:
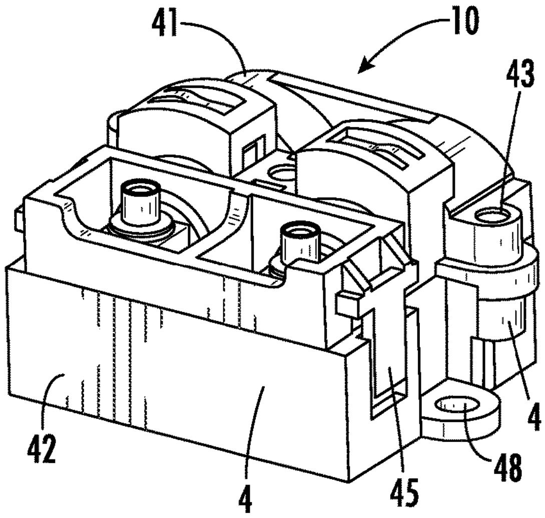
Figure 3:
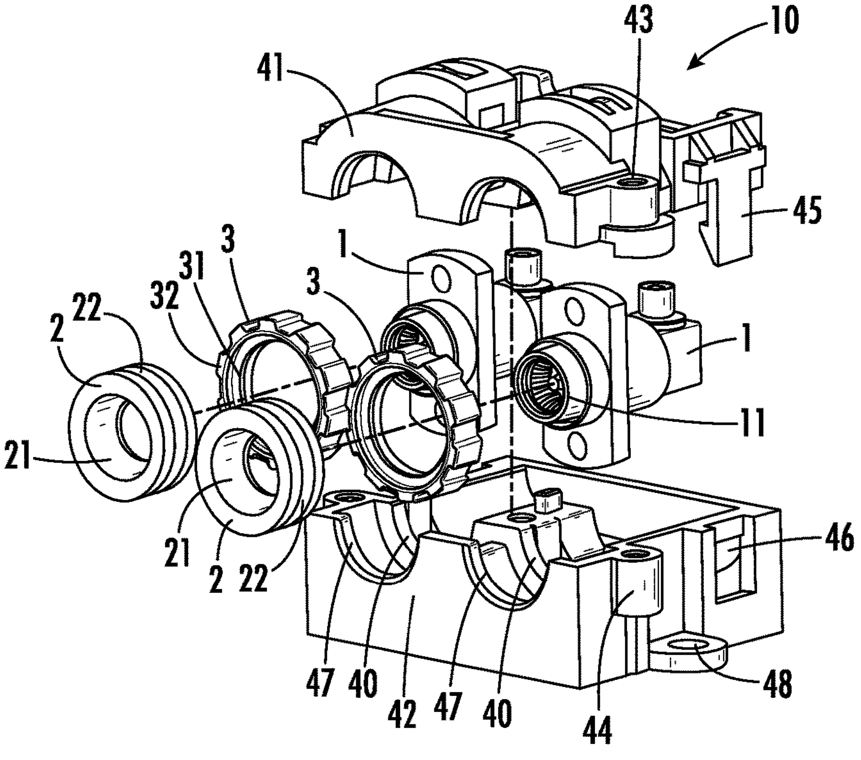
FIG. 3 is an exploded front perspective view of the connector assembly in FIG. 1.

First, connector assembly 10 according to an embodiment of the present disclosure is described referring to FIGS. 1 to 3, wherein, FIG. 1 is the perspective view of this connector assembly observed from the front, FIG. 2 is the perspective view of this connector assembly observed from the back, and FIG. 3 is the exploded perspective view of this connector assembly observed from the front.

The connector assembly 10 comprises one or a plurality of connectors 1, and the connectors have a port 11. The plurality of connectors 1 may be the same connector, or different connectors. The connector 1 may be an electrical connector or optical connector. For example, it may be a radio frequency connector. FIGS. 1 to 3 exemplarily show two radio frequency connectors and they are installed side by side in the housing 4. The housing 4 may be configured into two pieces. For example, it may comprise a housing cover 41 and housing base part 42. The housing cover 41 and housing base part 42 may be connected through screw connections on both sides and/or snap-fit connections on both sides. For this purpose, these two housing parts may have screw holes 43 and 44 on both sides to accommodate screws, and a snap hook 45 and slot 46 on both sides. The housing 4 may be made of plastic. For the connector 4 accommodated in the housing 4, the housing 4 made of plastic has certain elasticity, so it may be slightly deformed when it is compressed by the connector 4, which facilitates the reduction of load of the connector 1 during mating, so that the connector 1 is not easily damaged.

The connector assembly 10 may comprise a guide ring 2, where the guide ring can be installed in front of the port 11 of the connector 1 and is radially and elastically supported. For example, it can be radially and elastically supported by a flexible ring 3. The flexible ring 3 may have circumferentially distributed outer teeth 32. The independent flexible ring may be replaced by a radially and elastically supporting component, for example, a flexible part integrated with the guide ring 2.

Figure 6:
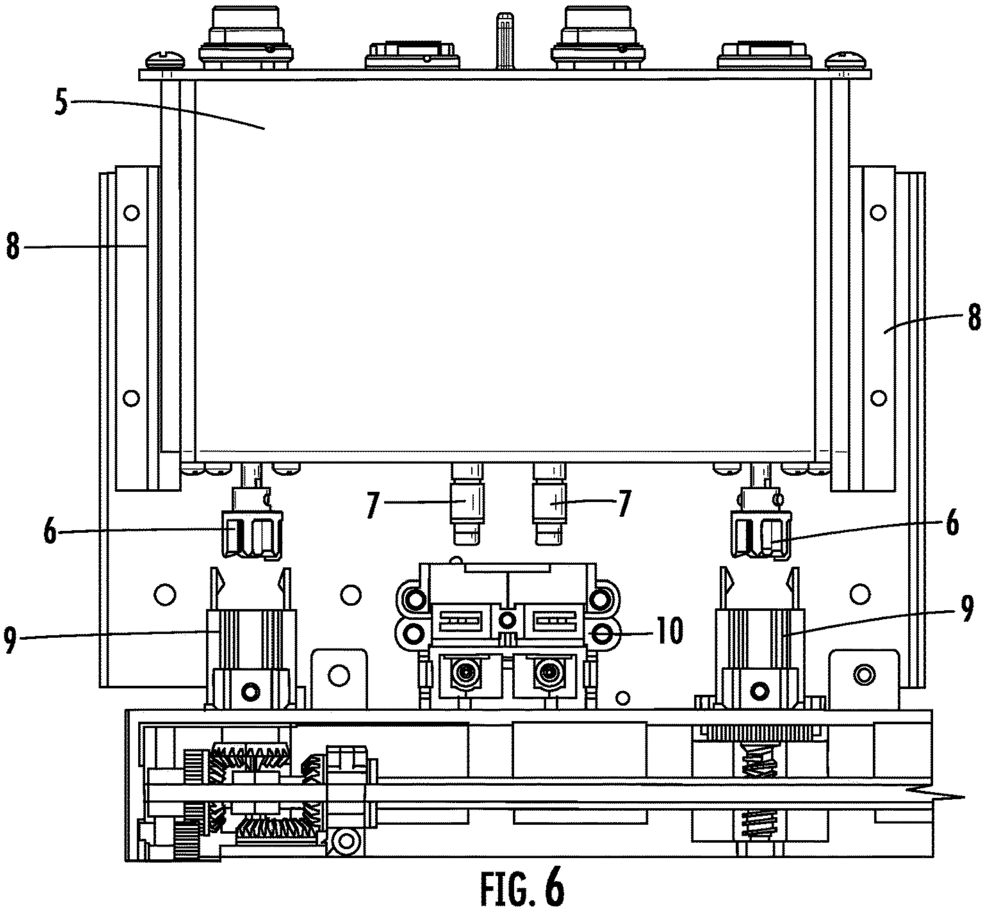
FIGS. 6 and 7 are partial views of a base station antenna in different states according to an embodiment of the present disclosure.
Figure 7:
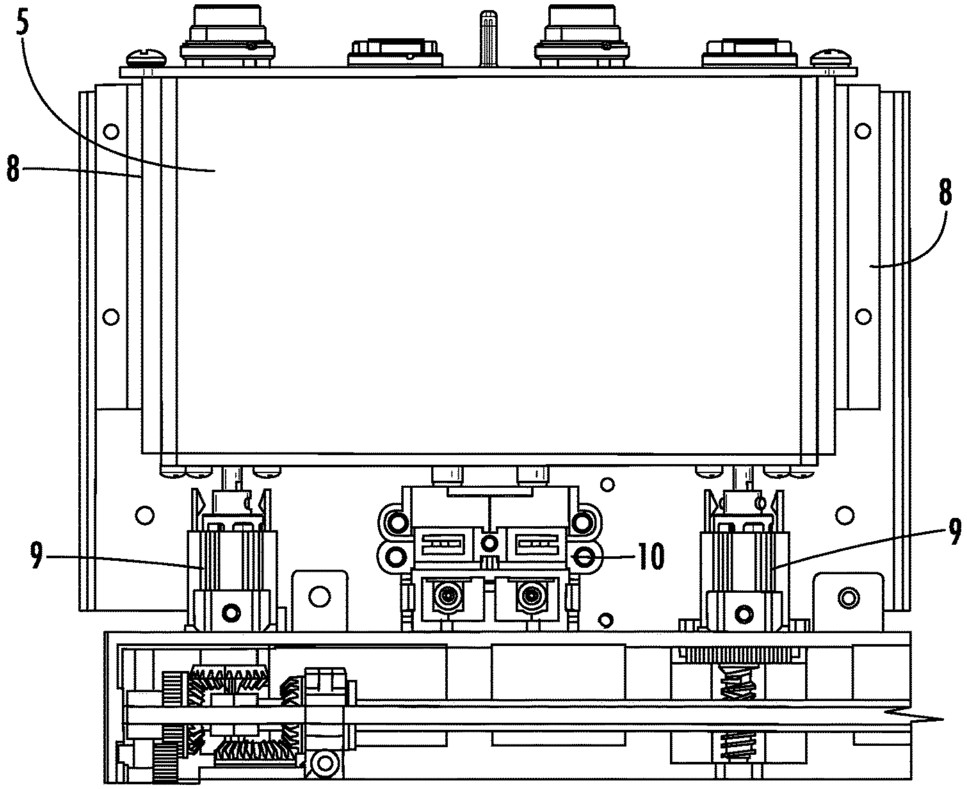
Figure 8:
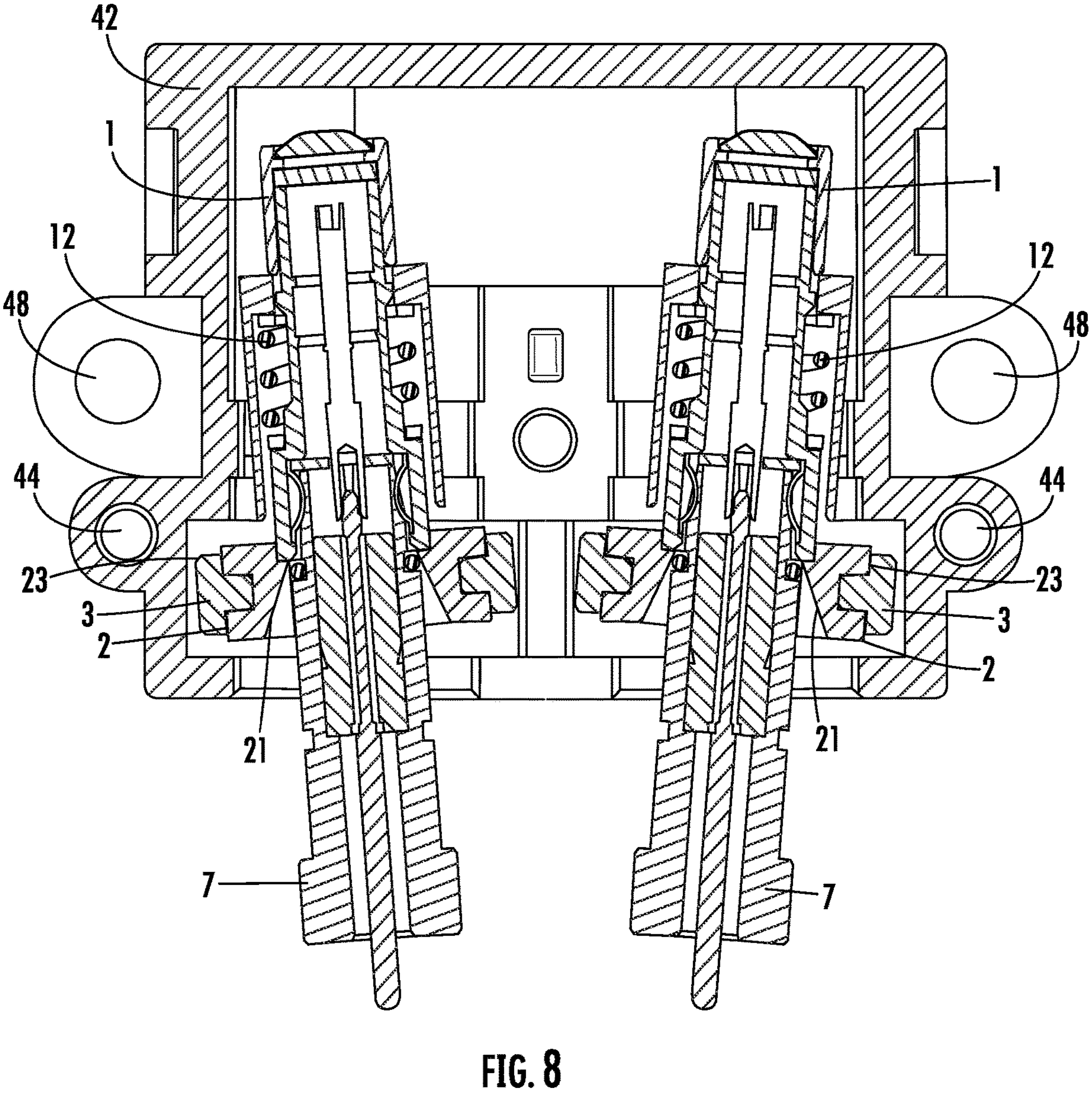
FIG. 8 is the schematic view describing the mating of matching connectors.

The guide ring 2 may have an inner surface 21 that tapers towards the port 11 of the connector 1 on part of the axial length, and is used to guide the port 11 of the connector 1 into the port of the matching connector 7 (refer to FIGS. 6 to 8). In some simple embodiments, the inner surface 21 of the guide ring 2 may be configured as an inner circular conical surface. To facilitate the positioning of the guide ring 2, the guide ring 2 may have counterbores 23 (refer to FIG. 8) on the end side facing the connector 1 and the guide ring 2 may be fit onto the port 11 of the connector 1 through the counterbores 23. To facilitate the connection between the guide ring 2 and flexible ring 3, the guide ring 2 may have grooves 22, such as ring grooves, on its outer peripheral surface, and the flexible ring 3 may have protrusions 31, such as annular protrusions, on its inner peripheral surface. The protrusions 31 may be embedded in the grooves 22, so that the guide ring 2 and flexible ring 3 form an axially locked connection.

The housing 4 may have receptacles 40 of the same quantity as the connector 1. Each receptacle can accommodate a component group comprising a connector 1, a guide ring 2 and a flexible ring 3. The corresponding receptacle 40 may have at least one stop for the positioning and fixing of at least one component in the component group. In the embodiment shown, the housing 4 may have an annular axial stop 47 extending inwards radially that is used for the guide ring 2. The axial stop 47 may axially position and fix the guide ring 2. In some embodiments, the inner surface 21 of the guide ring 2 may transition to the port 11 of the connector 1 on one side and/or transition to the inner surface of the axial stop 47 on the other side.

Figure 4:
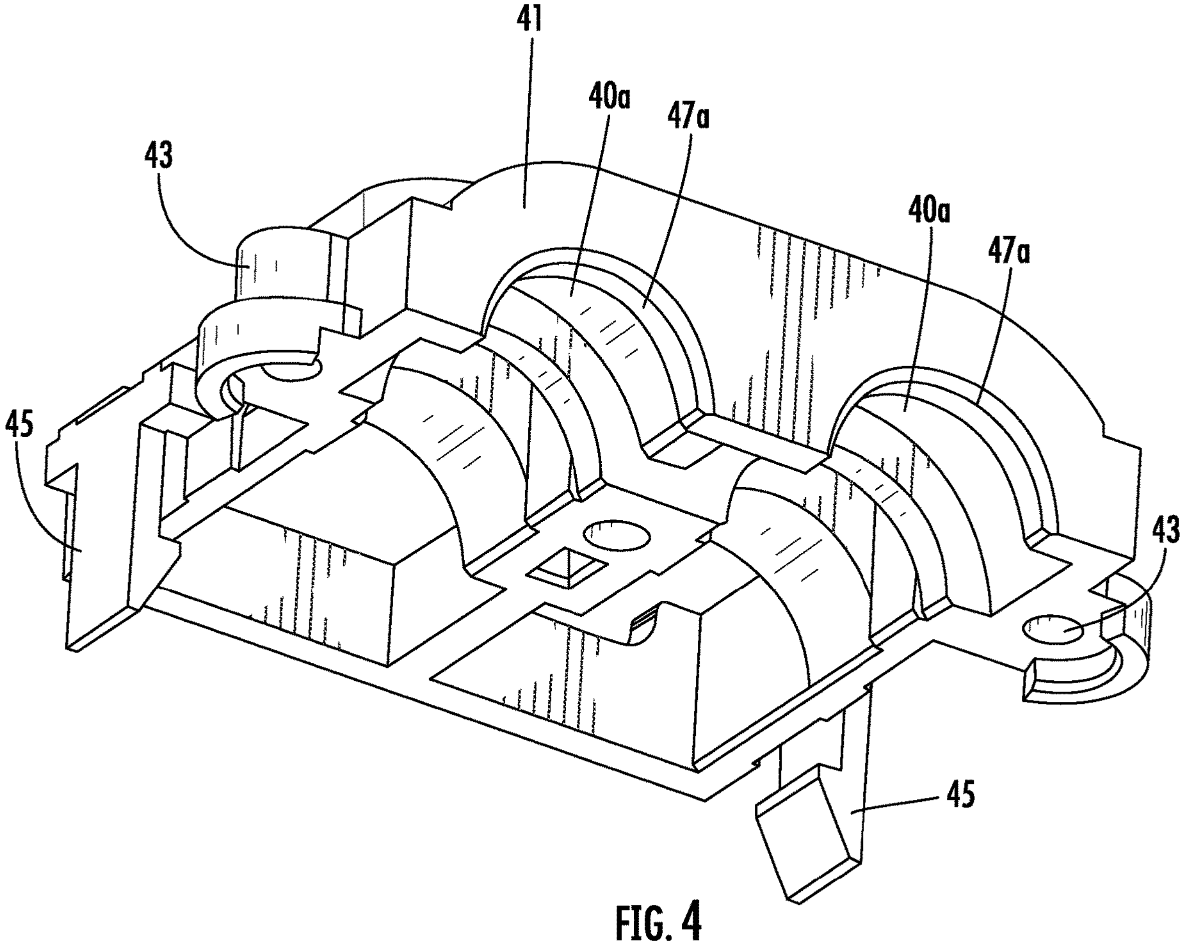
FIGS. 4 and 5 are perspective views of two housing parts of the housing of the connector assembly in FIG. 1.
Figure 5:
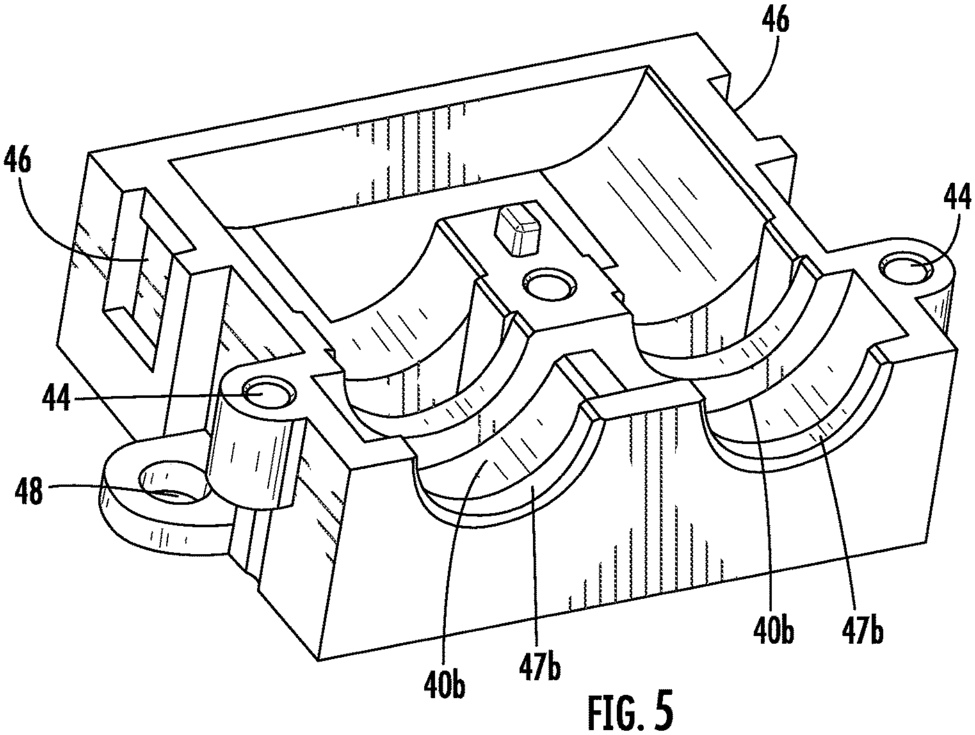

FIG. 4 is a bottom perspective view of the housing cover 41 of the housing 4 of the connector assembly 10 in FIG. 1, wherein, the internal details of the housing cover 41 can be observed. FIG. 5 is a top perspective view of the housing base part 42 of the housing 4 of the connector assembly 10 in FIG. 1, wherein the internal details of the housing base part 42 can be observed. As shown in FIG. 4, the housing cover 41 may have a screw hole 43 on both sides, a snap hook 45 on both sides, an upper part 40*a* of the receptacle 40 and an upper part 47*a* of the annular axial stop 47. As shown in FIG. 5, the housing base part 42 may have a screw hole 44 on both sides, a slot 46 on both sides, a lower part 40*b* of the receptacle 40 and a lower part 47*b* of the annular axial stop 47. The matching screw holes 43 and 44 can accommodate screws and therefore form screw connections. The matching snap hook 45 and slot 46 can form a snap-fit connection. For the mounting of the housing 4, the housing may also have another screw hole 48 on both sides, so as to fix the housing 4 on the base station antenna with screws.

FIGS. 6 and 7 are partial views of the base station antenna in different states according to an embodiment of the present disclosure, wherein, the radome of the base station antenna is omitted so that the internal structure of the base station antenna can be visible. In an end region of the longitudinal base station antenna as shown in FIGS. 6 and 7, the phase shifter drive module 5 can be linear movably-guided by the guide rail system 8 on both sides.

In FIG. 6, the phase shifter drive module 5 is mostly pushed into the radome of the base station antenna, wherein, the two driven joints 6 of the phase shifter drive module 5 are near the two driving joints 9 of the phase shifter transmission module, and the two matching connectors 7 of the phase shifter drive module 5 are near the two connectors 1 of the connector module 10 described in FIGS. 1 to 3.

In FIG. 7, the phase shifter drive module 5 has been pushed to the pre-determined mounting position in the radome of the base station antenna, wherein, the two driven joints 6 of the phase shifter drive module 5 are joined to the two corresponding driving joints 9 of the phase shifter transmission module, and the two matching connectors 7 of the phase shifter drive module 5 are mated to the two connectors 1 of the connector module 10. In the embodiments as shown in FIGS. 6 and 7, the respective connectors 1 are blind-mated to the respective matching connectors 7. As compared to prior art, as such blind mating can tolerate increased manufacturing error and mounting error of relevant parts of the base station antenna based on the technical measures of the present disclosure, this is advantageous in terms of cost. FIG. 8 describes the mating of matching connectors 1 and 7 using a highly simplified schematic view. FIG. 8 describes the connector assembly 10 described in FIGS. 1 to 3, but omits the housing cover 41 of the housing 4 of this connector assembly 10, and describes two matching connectors 7 in a highly simplified manner. Each pair of matching connectors 1 and 7 can have radial deviations and/or axial deviations and/or angular deviations. For clarity, FIG. 8 describes in an exaggerated manner the deviation between two matching connectors 7 and the deviation between the initial mounting position and the guide ring 2 and flexible 3 related to this deviation.

It can be understood that the phase shifter drive module is only an example of a module of the base station antenna that has a matching connector. In general, the base station antenna may comprise a functional module, where the functional module has a matching connector and the functional module and connector assembly can move relative to each other, so that the functional module and matching connector are mated to the connector of the connector assembly. For example, they are connected via blind mating. The basic concept of the present disclosure can be applied to single connectors or connectors in a group. Although blind-mating of matching connectors is illustrated herein, the present disclosure is not limited to the blind-mating of matching connectors. The embodiments shown relate to the application scenario of a connector in a base station antenna. However, it can be understood that in principle, the basic concept of the present disclosure can be applied to the application of any connector, particularly application of electrical connectors in electrical and/or electric connections.

It will be understood that, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc.).

Terms such as "top," "bottom," "upper," "lower," "above," "below," and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments disclosed herein can be combined in any way.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

The invention claimed is:

1. A connector assembly, comprising a connector (1), where the connector has a port (11), wherein the connector assembly further comprises a guide ring (2), where the guide ring is installed in front of the port of the connector and is radially and elastically supported, wherein the guide ring has an inner surface (21) that tapers towards the port of the connector on part of an axial length, and is used to guide the port of a matching connector (7) in the port of the connector.

2. The connector assembly according to claim 1, wherein the inner surface of the guide ring is configured as an inner circular conical surface.

3. The connector assembly according to claim 1, wherein the guide ring has counterbores (23) on the end side facing the connector and the guide ring being fit onto the port of the connector through the counterbores.

4. The connector assembly according to claim 1, wherein the inner surface of the guide ring transitions to the port of the connector.

5. The connector assembly according to claim 1, wherein the connector assembly comprises a flexible ring (3) fit onto the guide ring.

6. The connector assembly according to claim 5, wherein the guide ring has grooves (22) on its outer peripheral surface, and the flexible ring having protrusions (31) on its inner peripheral surface, wherein the protrusions are embedded in the grooves, so that the guide ring and flexible ring form an axially locked connection.

7. The connector assembly according to claim 6, wherein the grooves are ring grooves, and the protrusions are annular protrusions.

8. The connector assembly according to claim 5, wherein the flexible ring has circumferentially distributed outer teeth (32).

9. The connector assembly according to claim 1, wherein the connector assembly comprises a housing (4), where the housing has an receptacle (40), wherein the receptacle is used to accommodate the connector, guide ring and component that radially and elastically supports the guide ring.

10. The connector assembly according to claim 9, wherein the housing comprises an annular axial stop (47) extending inwards radially that is used for the guide ring.

11. The connector assembly according to claim 10, wherein the inner surface of the guide ring transitions to the inner surface of the axial stop.

12. The connector assembly according to claim 9, wherein the housing may be configured into two pieces, and comprise the housing base part (42) and housing cover (41).

13. The connector assembly according to claim 12, wherein the housing cover and housing base part are connected through at least one screw connection and at least one snap-fit connection.

14. The connector assembly according to claim 9, wherein the housing is made of plastic.

15. The connector assembly according to claim 1 wherein the connector assembly comprises at least two connectors installed in parallel to each other.

16. The connector assembly according to claim 1 wherein the connector is an electrical connector or optical fiber connector.

17. The connector assembly according to claim 16, wherein the connector is a radio frequency connector.

18. A base station antenna, which comprises the connector assembly according to claim 1.

19. The base station antenna according to claim 18, wherein the base station antenna comprises a functional module, where the functional module has a matching connector and the functional module and connector assembly moving relative to each other, so that the functional module and matching connector are mated to the connector of the connector assembly.

20. The base station antenna according to claim 19, wherein at least one of the functional module and connector assembly being guided, so that the matching connector of the functional module and the connector of the connector assembly are mated via blind mating.

* * * * *